(12) United States Patent
Wolf

(10) Patent No.: US 9,308,950 B2
(45) Date of Patent: Apr. 12, 2016

(54) METHOD AND CONTROL DEVICE FOR OPERATING A MOTOR VEHICLE HAVING MULTIPLE AIR-GUIDING DEVICES

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/804,387

(22) Filed: Jul. 21, 2015

(65) Prior Publication Data

US 2016/0016618 A1 Jan. 21, 2016

(30) Foreign Application Priority Data

Jul. 21, 2015 (DE) .......................... 10 2014 110 199

(51) Int. Cl.
  *B62D 35/00* (2006.01)
  *B62D 35/02* (2006.01)
  *B62D 37/02* (2006.01)

(52) U.S. Cl.
  CPC .............. *B62D 37/02* (2013.01); *B62D 35/007* (2013.01); *B62D 35/02* (2013.01)

(58) Field of Classification Search
  CPC .... B62D 35/00; B62D 35/005; B62D 35/007; B62D 35/02; B62D 37/02
  USPC ........................................... 296/180.1, 180.5
  See application file for complete search history.

(56) References Cited

U.S. PATENT DOCUMENTS

| | | | | |
|---|---|---|---|---|
| 3,618,998 A * | 11/1971 | Swauger | .............. | B62D 35/005 280/762 |
| 4,810,022 A * | 3/1989 | Takagi | ................. | B62D 35/005 180/197 |
| 5,054,844 A * | 10/1991 | Miwa | ................... | B62D 35/005 280/848 |
| 5,322,340 A * | 6/1994 | Sato | ....................... | B62D 25/20 180/68.1 |
| 8,798,868 B2 * | 8/2014 | Mares | ................... | B60T 8/1755 104/282 |
| 2007/0001482 A1* | 1/2007 | Larson | ................. | B62D 35/007 296/180.5 |
| 2009/0140543 A1* | 6/2009 | Caldirola | ............... | B60K 11/08 296/180.5 |
| 2011/0148143 A1* | 6/2011 | Ondracek | ............ | B62D 35/008 296/180.5 |

(Continued)

FOREIGN PATENT DOCUMENTS

| | | | |
|---|---|---|---|
| DE | 10 2008 043 470 | 5/2010 | |
| JP | 2008230470 | * 10/2008 | ............. B62D 37/02 |

*Primary Examiner* — Gregory Blankenship
(74) *Attorney, Agent, or Firm* — Gerald E. Hespos; Michael J. Porco; Matthew T. Hespos

(57) ABSTRACT

A method for operating a motor vehicle (10) includes selecting one of an economical driving mode in which an air resistance is minimized, a performance driving mode in which an optimum lift balance is set at the front and rear axles, and a sport driving mode in which front and rear axle downforces are maximized. The rear diffuser (12) and the rear spoiler (12) are transferred into first deployed positions when the economical driving mode is selected. The rear diffuser (12) and the rear spoiler (13) are transferred into second deployed positions when the performance driving mode is selected. The rear diffuser (12) is transferred into a retracted rear diffuser position and the rear spoiler (13) is transferred into a third deployed rear spoiler position when the sport driving mode is selected.

11 Claims, 3 Drawing Sheets

(56) References Cited

U.S. PATENT DOCUMENTS

| | | | | |
|---|---|---|---|---|
| 2013/0221701 A1* | 8/2013 | De Luca | ............... | B62D 37/02 296/180.5 |
| 2013/0238198 A1* | 9/2013 | Prentice | ............... | B62D 35/02 701/49 |
| 2013/0257093 A1* | 10/2013 | del Gaizo | ............... | B62D 35/02 296/180.5 |
| 2014/0252800 A1* | 9/2014 | D'Arcy | ............... | B62D 35/005 296/180.5 |
| 2015/0175223 A1* | 6/2015 | Jeong | ............... | B62D 35/007 296/180.5 |
| 2015/0232138 A1* | 8/2015 | Parry-Williams | ...... | B62D 35/02 296/180.5 |
| 2015/0353149 A1* | 12/2015 | Wolf | ............... | B62D 35/007 296/180.5 |

* cited by examiner

METHOD AND CONTROL DEVICE FOR OPERATING A MOTOR VEHICLE HAVING MULTIPLE AIR-GUIDING DEVICES

CROSS REFERENCE TO RELATED APPLICATION

This application claims priority under 35 USC 119 to German Patent Appl. No. 10 2014 110 199.5 filed on Jul. 21, 2014, the entire disclosure of which is incorporated herein by reference.

BACKGROUND

1. Field of the Invention

The invention relates to a method for operating a motor vehicle having multiple air-guiding devices, and to a control device for carrying out the method.

2. Description of the Related Art

DE 10 2008 043 470 A1 discloses a motor vehicle having a rear-end diffuser, a rear-end spoiler, a front spoiler and an air scoop in the region of an engine hood. DE 10 2008 043 470 A1 also discloses a method for controlling airflow over the motor vehicle to a certain extent. However, there is a demand for a method to set an airflow in a defined manner for defined driving operating states of the motor vehicle.

An object of the invention is to provide a method for operating a motor vehicle having plural air-guiding devices, and a control device for carrying out the method.

SUMMARY

The rear diffuser is transferred to a first rear diffuser position and the rear spoiler is transferred to a first rear spoiler position to ensure economical driving in which an air resistance of the motor vehicle is minimized.

The rear diffuser is transferred into a second rear diffuser position and the rear spoiler is transferred into a second rear spoiler position to ensure a performance driving mode of the motor vehicle in which an optimum lift balance in terms of driving dynamics is set at the front and rear axles.

The rear diffuser is transferred into a retracted rear diffuser position and the rear spoiler is transferred into a third rear spoiler position to ensure a sport driving mode of the motor vehicle, in which front-axle downforce and rear-axle downforce of the motor vehicle are maximized.

Thus, a defined, particularly advantageous airflow can be achieved for the economical driving mode, the performance driving mode and the sport driving mode by the positions of the rear spoiler and the rear diffuser.

The rear diffuser and the rear spoiler may be substantially horizontal in their first positions for the economical driving mode of the motor vehicle.

The rear diffuser that is in the second rear diffuser position for the performance driving mode of the motor vehicle is inclined farther up and is retracted farther in relation to the first rear diffuser position. Additionally, the rear spoiler that is in the second rear spoiler position for the performance driving mode is inclined farther up and is deployed farther in relation to the first rear spoiler position.

The rear diffuser that is in the third rear diffuser position for the sport driving mode of the motor vehicle is retracted, and the rear spoiler that is in the third rear spoiler position for the sport driving mode is inclined more steeply up and is deployed farther in relation to the first and second rear spoiler positions.

The motor vehicle may further comprise a front diffuser in addition to the rear diffuser and rear spoiler. The front diffuser may be transferred into: a retracted front diffuser position for the economical driving mode of the motor vehicle; a first deployed front diffuser position for the performance driving mode of the motor vehicle; and a second deployed front diffuser position for the sport driving mode of the motor vehicle. Thus, the airflow over the motor vehicle can be improved further by the above-described positioning of the front diffuser in the economical driving mode, performance driving mode and sport driving mode.

The front diffuser may be inclined up in the first deployed front diffuser position for the performance driving mode of the motor vehicle.

The front diffuser may be inclined up more steeply in the second deployed front diffuser position for the sport driving mode than in the first deployed front diffuser position for the performance driving mode.

Exemplary embodiments of the invention will be discussed in more detail on the basis of the drawing, without the invention being restricted to these embodiments.

DETAILED DESCRIPTION

Figure 1:
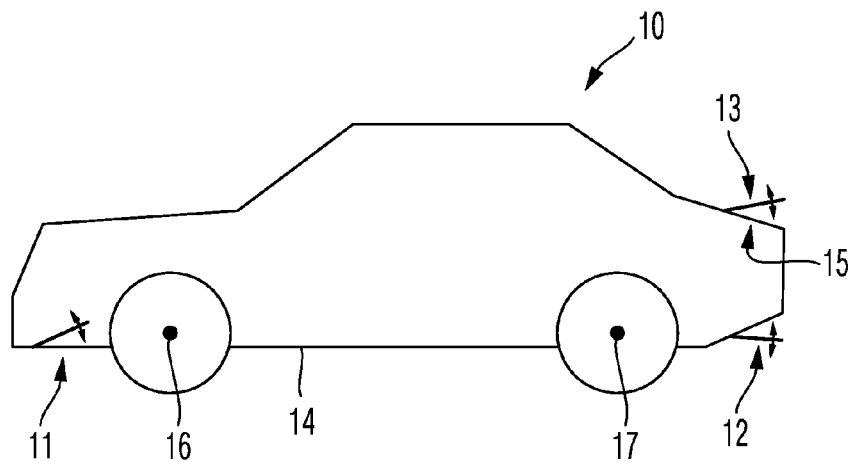
FIG. 1 is a schematic illustration of a motor vehicle having multiple air-guiding devices.

FIG. 1 shows, in highly schematized form, a motor vehicle 10 having multiple air-guiding devices, specifically a front diffuser 11, a rear diffuser 12 and a rear spoiler 13.

Each of the air-guiding devices 11, 12 and 13 can assume a retracted position where the respective air-guiding devices 11, 12 and 13 is flush with a body structure of the motor vehicle 10 adjacent to the respective air-guiding device 11, 12, 13, specifically flush with an underside 14 of the motor vehicle 10 in the region of the diffusers 11, 12, and flush with a rear top side 15 of the motor vehicle 10 in the region of the rear spoiler 13. The rear top side may be a body structure adjacent to a luggage compartment cover in the case of a front-engine motor vehicle and may be an engine compartment cover or by a body structure adjacent to the engine compartment cover in the case of a rear-engine or mid-engine motor vehicle.

The air-guiding devices 11, 12, 13 are not flush with the body structure when the air-guiding devices 11, 12 and 13 are in the deployed positions. A position deployed in relation to the respective retracted position does not imperatively mean that the respective air-guiding device projects out. Rather, the respective air-guiding device may also project inward into the vehicle in relation to the retracted position.

The invention relates to a method and to a control device for operating the motor vehicle 10, specifically at least the rear air-guiding devices 12, 13 and, in some embodiments, the front-end air-guiding device 11, to ensure optimum airflows for an economical driving mode, a performance driving mode and a sport driving mode of the motor vehicle 10.

An economical driving mode of the motor vehicle 10 should be understood to mean a driving mode in which an air resistance of the motor vehicle is minimized, for example, so that as little fuel as possible is consumed.

A sport driving mode of the motor vehicle 10 should be understood to mean a driving mode in which maximum downforce is desired both at a front axle 16 and at a rear axle 17 of the motor vehicle.

A performance driving mode should be understood to mean a driving mode in which an optimum lift balance in terms of driving dynamics is set at the front axle 16 and rear axle 17, that is to say in which expedient rear-axle lift in terms of driving dynamics, and an expedient lift balance between the axles 16, 17 of the motor vehicle 10, is set.

Figure 2:
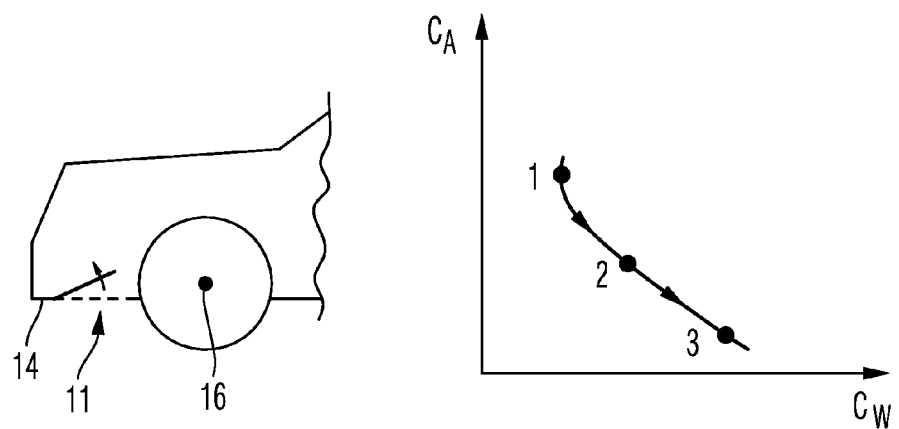
FIG. 2 shows the region of a front diffuser of the motor vehicle of FIG. 1, as a first air-guiding device, with a state graph for the first air-guiding device.
Figure 3:
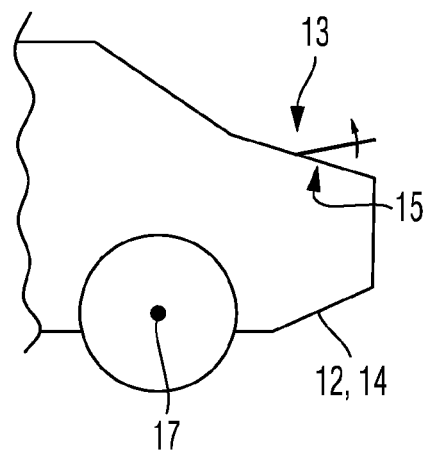
FIG. 3 shows the region of a rear spoiler of the motor vehicle of FIG. 1, as a second air-guiding device, with a state graph for the second air-guiding device.
Figure 3:
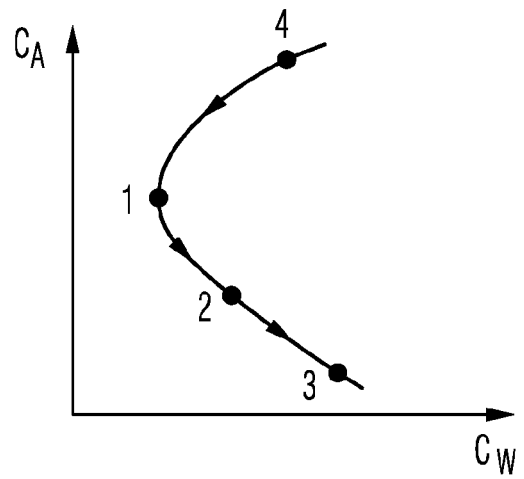
Figure 4:
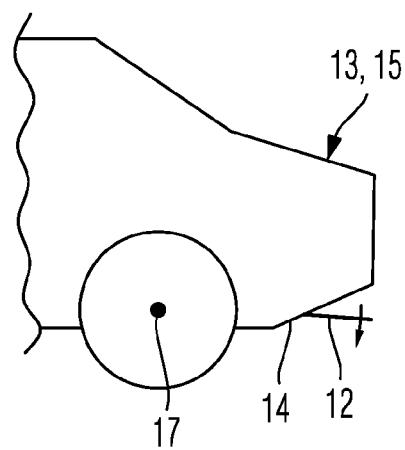
FIG. 4 shows the region of a rear diffuser of the motor vehicle of FIG. 1, as a third air-guiding device, with a state graph for said third air-guiding device.
Figure 4:
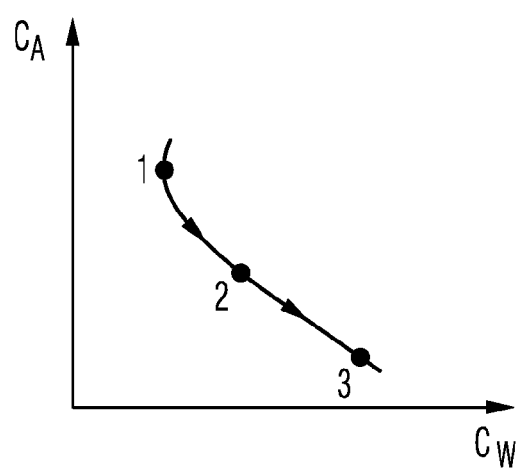

FIGS. 2 to 4 show state graphs or polar diagrams for the respective air-guiding devices 11, 12 and 13 of FIG. 1, in the three above-mentioned driving modes, specifically the economical driving mode, the performance driving mode and the sport driving mode. The state graphs or polar diagrams of FIGS. 2 to 4 each depict the economical driving mode is depicted as state 1, the performance driving mode as state 2, and the sport driving mode as state 3. The state graphs or polar diagrams also show the corresponding air resistance coefficients cW and the corresponding lift coefficients cA.

To ensure the economical driving mode for the motor vehicle 10, in which an air resistance of the motor vehicle 10 is minimized, the rear diffuser 12 is transferred into a first deployed rear diffuser position and the rear spoiler 13 is transferred into a first deployed rear spoiler position. The rear diffuser 12 is horizontal in the first deployed rear diffuser position for the economical driving mode, and the rear spoiler 13 also is substantially horizontal in the first deployed rear spoiler position for the economical driving mode.

To ensure the performance driving mode of the motor vehicle 10, in which an optimum lift balance in terms of driving dynamics is set between front axle 16 and rear axle 17, the rear diffuser 12 is transferred into a second deployed rear diffuser position that differs from the first deployed rear diffuser position, and the rear spoiler 13 is transferred into a second deployed rear spoiler position that differs from the first deployed rear spoiler position.

The rear diffuser 12 is in the second deployed rear diffuser position for the performance driving mode and is retracted further as compared to the first deployed rear diffuser position of the economical driving mode. More particularly, the rear diffuser 12 in the second deployed rear diffuser position is shifted farther in the direction of the retracted rear diffuser position and is inclined upward. The rear spoiler 13 is in second deployed rear spoiler position for the performance driving mode and is deployed further as compared to the first deployed rear spoiler position for the economical driving mode. More particularly, the rear spoiler 13 in the second deployed rear spoiler position is deflected out farther relative to the retracted rear spoiler position and is inclined up.

The axle downforce at the front and rear axles 16 and 17 is maximized in the sport driving mode of the motor vehicle 10. To ensure the sport driving mode, the rear diffuser 12 is transferred into a retracted rear diffuser position and the rear spoiler 13 is transferred into a third deployed rear spoiler position. In the retracted rear diffuser position, the rear diffuser 12 is flush with areas of the underside 14 of the motor vehicle 10 near the rear diffuser 12. In the third deployed rear spoiler position, the rear spoiler 13 is deployed farther and is inclined more steeply up as compared to both the first deployed rear spoiler position of the economical driving mode and the second deployed rear spoiler position for the performance driving mode.

Both the rear-end diffuser 12 and the rear-end spoiler 13 project out in the deployed positions.

If, as shown in FIG. 1, the motor vehicle 10 comprises the front diffuser 11 in addition to the rear air-guiding devices 12 and 13. The front diffuser 11 is transferred into a retracted front diffuser position in the economical driving mode of the motor vehicle, is transferred into a first deployed front diffuser position in the performance driving mode of the motor vehicle 10, and is transferred into a second deployed front diffuser position in the sport driving mode.

The front diffuser 11 is substantially flush with an adjacent region of the underside 14 of the motor vehicle 10 when the front diffuser 11 assumes the retracted front diffuser position during the economical driving mode of the motor vehicle.

The front diffuser 11 assumes a deployed, upwardly inclined position in each of the performance driving mode and in the sport driving mode and is directed inward into the vehicle. The deployed position of the front-end diffuser 14 is inclined further up in the sport driving mode 3 than in the performance driving mode 2, as shown in FIG. 5.

From the above statements, it follows that the front diffuser 11 assumes the retracted state in the economical driving mode (state 1 in FIG. 2) and the rear-end diffuser 12 assumes the retracted state in the sport driving mode (state 3 in FIG. 4).

The rear spoiler 13 is deployed in each of the economical driving mode, the performance driving mode and sport driving mode so that a separate state 4 is shown in the state graph or polar diagram of FIG. 3 for the retracted state of the rear spoiler 13.

Figure 5:
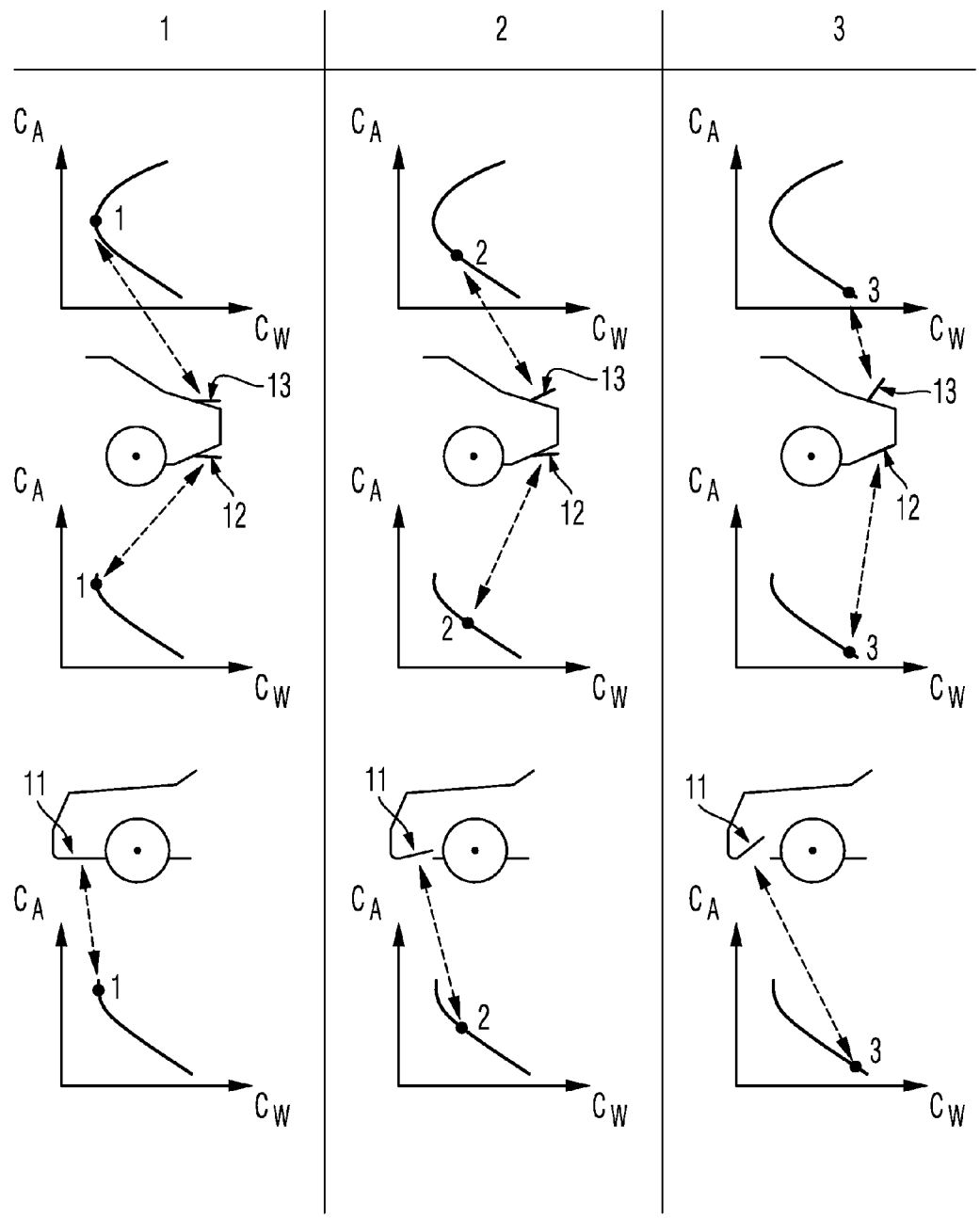
FIG. 5 is a diagram further illustrating the method for operating a motor vehicle having multiple air-guiding devices.

FIG. 5 illustrates the different positions of the air-guiding devices 11, 12 and 13 in the economical driving mode 1, performance driving mode 2 and sport driving mode 3 on the basis of a highly schematic table.

The invention also relates to a control device for carrying out the method, wherein the control device comprises means for carrying out the method. The means includes hardware of the control device and software of the control device. The hardware of the control device includes data interfaces for exchange of data with the assemblies involved in actuating the air-guiding devices 11, 12 and 13. The hardware further includes a processor for data processing and a memory for data storage.

The software of the control device includes program modules for carrying out the method of the invention.

The control device controls the air-guiding devices 11, 12 and 13 preferably in automated fashion on the basis of the desired driving mode. The economical driving mode, the sport driving mode and/or the performance driving mode may be predefined or selected by a driver for example by actuation of a driving mode button. On the other hand, provision may be made for the desired driving mode to be determined automatically on the basis of a present actuation of the accelerator pedal by the driver and/or a present actuation of the brake pedal by the driver.

At least one deployed position of the air-guiding devices 11, 12 and 13, that is to say at least one of the deployed rear diffuser positions and/or at least one of the deployed rear spoiler positions and/or at least one of the deployed front diffuser positions, is selected or determined automatically by the control device in a manner dependent on the present driving speed of the motor vehicle. Thus, for example in the sport driving mode, the deployed position of the rear spoiler 13 may be dependent on the driving speed.

The invention can be used in front-engine, rear-engine or mid-engine vehicles. The invention also can be used in fast-back vehicles and hatchback vehicles.

What is claimed is:

1. A method for operating a motor vehicle having multiple air-guiding devices that include at least having a rear diffuser and a rear spoiler, the method comprising:
    selecting one of an economical driving mode where air resistance of the motor vehicle is minimized, a performance driving mode in which an optimum lift balance in terms of driving dynamics is set at the front axle and rear axle and a sport driving mode where a front-axle downforce and a rear-axle downforce of the motor vehicle are maximized;
    transferring the rear-end diffuser into a first deployed rear diffuser position and substantially simultaneously transferring the rear spoiler into a first deployed rear spoiler position when the economical driving mode is selected;
    transferring the rear diffuser into a second deployed rear diffuser position and transferring the rear spoiler is into a second deployed rear spoiler position when the performance driving mode is selected; and
    transferring the rear diffuser into a retracted rear diffuser position and transferring the rear spoiler into a third deployed rear spoiler position when the sport driving mode is selected.

2. The method of claim 1, wherein the rear diffuser and the rear spoiler are substantially horizontal for the economical driving mode of the motor vehicle.

3. The method of claim 2, wherein, the rear diffuser that is transferred to the second deployed rear diffuser position for the performance driving mode of the motor vehicle is inclined farther up and is retracted farther than when the rear diffuser is in the first deployed rear diffuser position, and the rear spoiler that is transferred to the second deployed rear spoiler position is inclined farther up and is deployed farther than when the rear spoiler is in the first deployed rear spoiler position.

4. The method of claim 3, wherein the rear spoiler (13) that is transferred into the third deployed rear spoiler position for the sport driving mode of the motor vehicle is inclined more steeply up and further deployed as compared to the first and second deployed rear spoiler positions and the second deployed rear spoiler position.

5. The method of claim 1, wherein the motor vehicle further comprises a front diffuser, the method further comprising:
    transferring the front diffuser into a retracted front diffuser position for the economical driving mode of the motor vehicle;
    transferring the front diffuser into a first deployed front diffuser position for the performance driving mode of the motor vehicle; and
    transferring the front diffuser into a second deployed front diffuser position for the sport driving mode of the motor vehicle.

6. The method of claim 5, wherein the front-end diffuser is inclined up in first deployed front diffuser position for the performance driving mode of the motor vehicle.

7. The method of claim 6, wherein the front diffuser is inclined up more steeply in the second deployed front diffuser position for the sport driving mode of the motor vehicle than in the first deployed front diffuser position.

8. The method of claim 5, wherein the front and rear diffusers are substantially flush with adjacent body structures of the motor vehicle when disposed respectively in the retracted front and rear diffuser positions.

9. The method of claim 1, wherein the selecting step is carried out on a speed-dependent basis.

10. The method of claim 1, wherein the selecting step is carried out by a driver actuation.

11. A control device of a motor vehicle, characterized in that said control device has means for carrying out the method of claim 1.

* * * * *